United States Patent
Zourob et al.

(10) Patent No.: US 12,353,660 B2
(45) Date of Patent: Jul. 8, 2025

(54) METHOD AND APPARATUS FOR INTERFACING WITH A TOUCH SENSOR

(71) Applicant: Telefonaktiebolaget LM Ericsson (publ), Stockholm (SE)

(72) Inventors: Mohammed Zourob, London (CA); Alexander Hunt, Tygelsjö (SE); Andreas Kristensson, Södra Sandby (SE); Mohammed Abdulaziz, Lund (SE); Bryan Smith, Råå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/612,285

(22) Filed: Mar. 21, 2024

(65) Prior Publication Data

US 2024/0231535 A1 Jul. 11, 2024

Related U.S. Application Data

(63) Continuation-in-part of application No. 18/255,472, filed as application No. PCT/EP2020/086794 on Dec. 17, 2020.

(51) Int. Cl.
*G06F 3/041* (2006.01)
*G06F 3/044* (2006.01)

(52) U.S. Cl.
CPC ........ *G06F 3/04166* (2019.05); *G06F 3/0446* (2019.05)

(58) Field of Classification Search
CPC .. G06F 3/0418; G06F 3/0446; G06F 3/04166; G06F 2203/04104
See application file for complete search history.

(56) References Cited

U.S. PATENT DOCUMENTS

| | | | |
|---|---|---|---|
| 8,022,317 | B2 | 9/2011 | Ely |
| 2011/0175835 | A1 | 7/2011 | Wang |
| 2012/0075205 | A1 | 3/2012 | Huang et al. |
| 2013/0176270 | A1 | 7/2013 | Cattivelli et al. |
| 2015/0035768 | A1 | 2/2015 | Shahparnia et al. |

(Continued)

FOREIGN PATENT DOCUMENTS

| | | |
|---|---|---|
| EP | 2372504 A2 | 10/2011 |
| KR | 101582597 B1 | 1/2016 |
| KR | 102081809 B1 | 2/2020 |

OTHER PUBLICATIONS

An, Jae-Sung , et al., "A 3.9-KHz Frame Rate and 61.0-dB SNR Analog Front-End IC With 6-bit Pressure and Tilt Angle Expressions of Active Stylus Using Multiple-Frequency Driving Method for Capacitive Touch Screen Panels", IEEE Journal of Solid-State Circuits, vol. 53, No. 1, Jan. 2018, 17 pages.

*Primary Examiner* — Muhammad N Edun
(74) *Attorney, Agent, or Firm* — Murphy, Bilak & Homiller, PLLC

(57) ABSTRACT

A technique for reading the columns and rows of a touch sensor provides several advantages, including scalability to touch sensors with high column/row counts. Reading the touch sensor relies on combining the row or column outputs of the touch sensor, during column and/or row excitation of the touch sensor, with the resulting combined signal or signals transformed into the frequency domain and touch detection based on evaluation of the frequency-domain values corresponding to the excitation frequencies.

10 Claims, 8 Drawing Sheets

(56) References Cited

U.S. PATENT DOCUMENTS

| | | |
|---|---|---|
| 2015/0091858 A1 | 4/2015 | Rosenberg et al. |
| 2015/0091859 A1 | 4/2015 | Rosenberg et al. |
| 2015/0309610 A1 | 10/2015 | Rabii et al. |
| 2016/0162011 A1 | 6/2016 | Verma et al. |
| 2016/0195990 A1 | 7/2016 | Han et al. |
| 2016/0259467 A1 | 9/2016 | Nayyar et al. |
| 2016/0378251 A1* | 12/2016 | Aznoe .................. G06F 3/0488 345/158 |
| 2017/0199022 A1 | 7/2017 | Anderson et al. |
| 2017/0199626 A1 | 7/2017 | D'Souza |
| 2017/0344174 A1 | 11/2017 | Pant et al. |
| 2018/0307376 A1 | 10/2018 | Citta |
| 2018/0329563 A1 | 11/2018 | Han et al. |
| 2019/0050102 A1 | 2/2019 | Johnson et al. |
| 2019/0138148 A1 | 5/2019 | Kwon |
| 2020/0050320 A1 | 2/2020 | Yang et al. |
| 2020/0326795 A1 | 10/2020 | Chang et al. |
| 2021/0191562 A1 | 6/2021 | Han |
| 2022/0075485 A1 | 3/2022 | Citta |

* cited by examiner

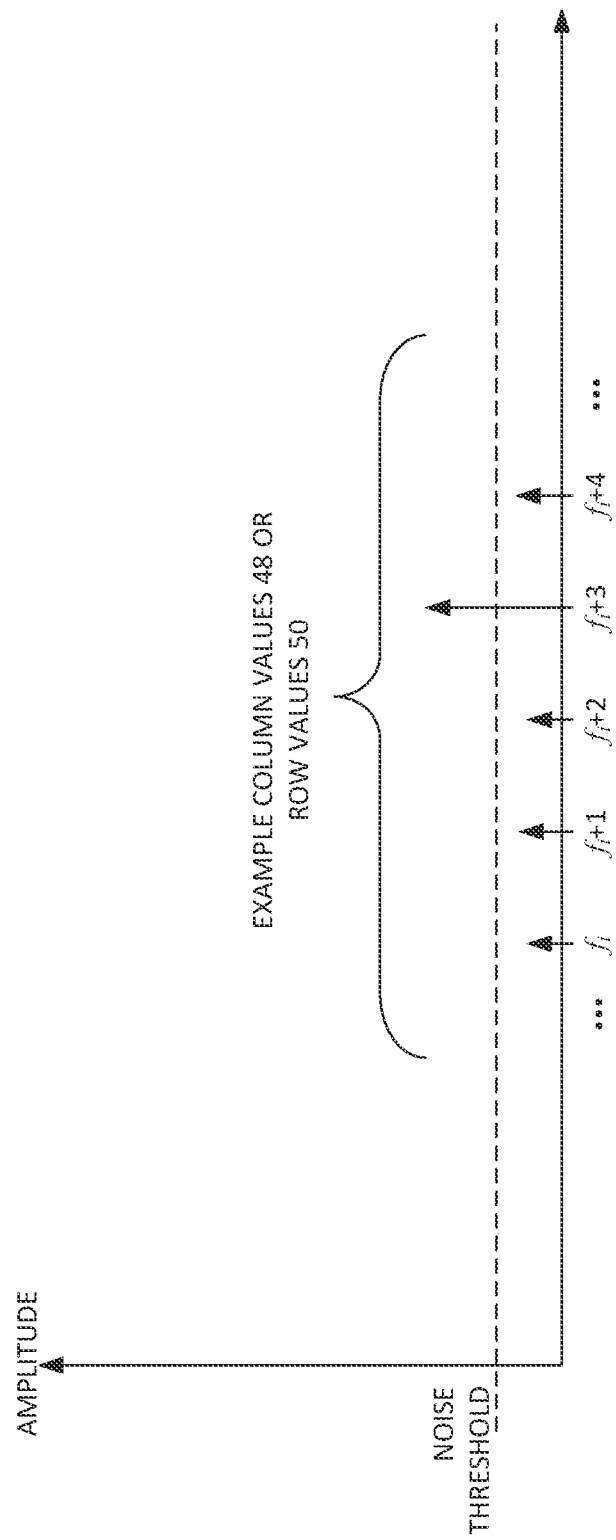

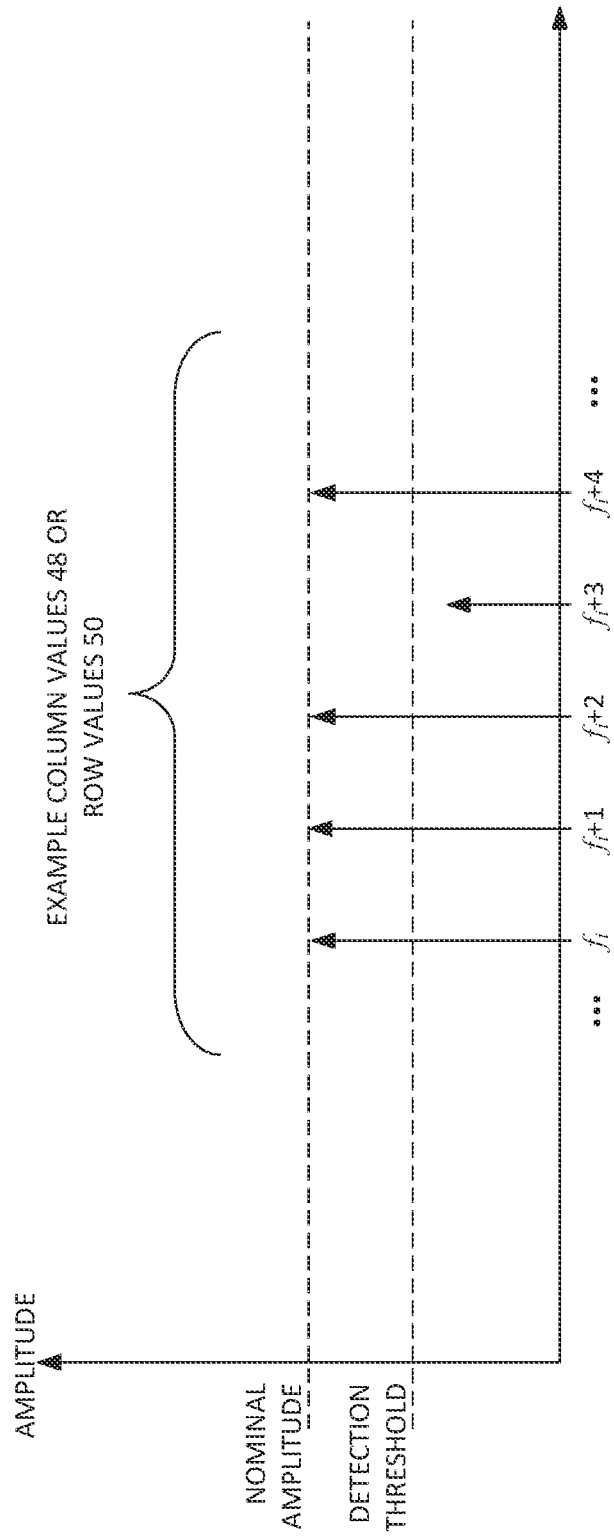

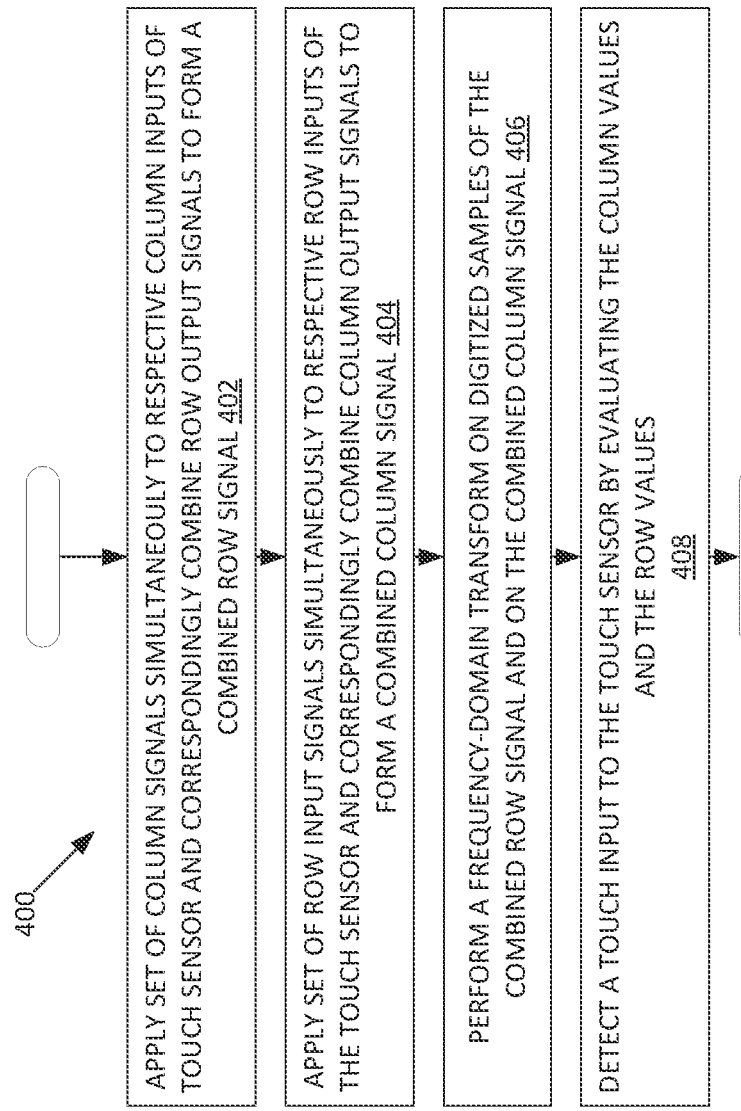

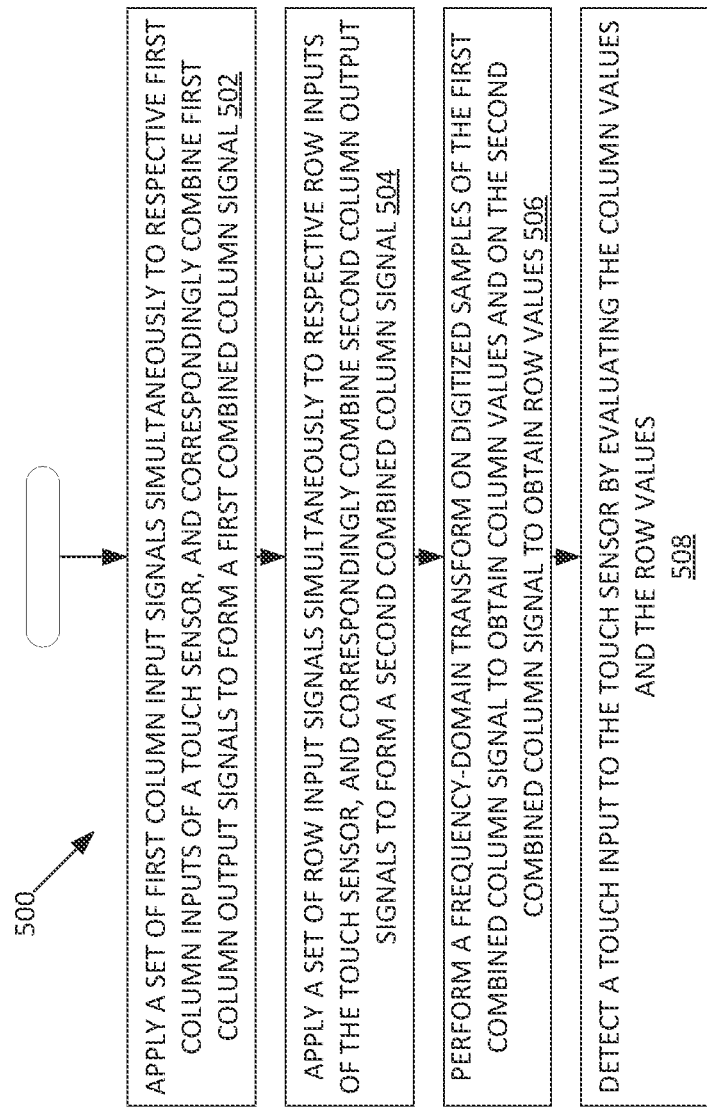

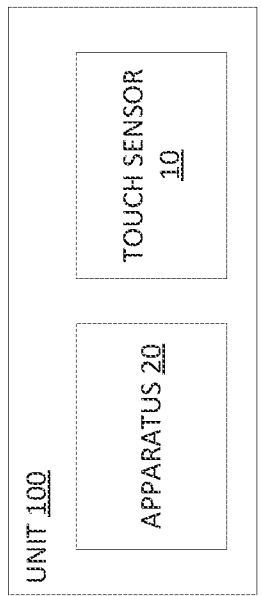
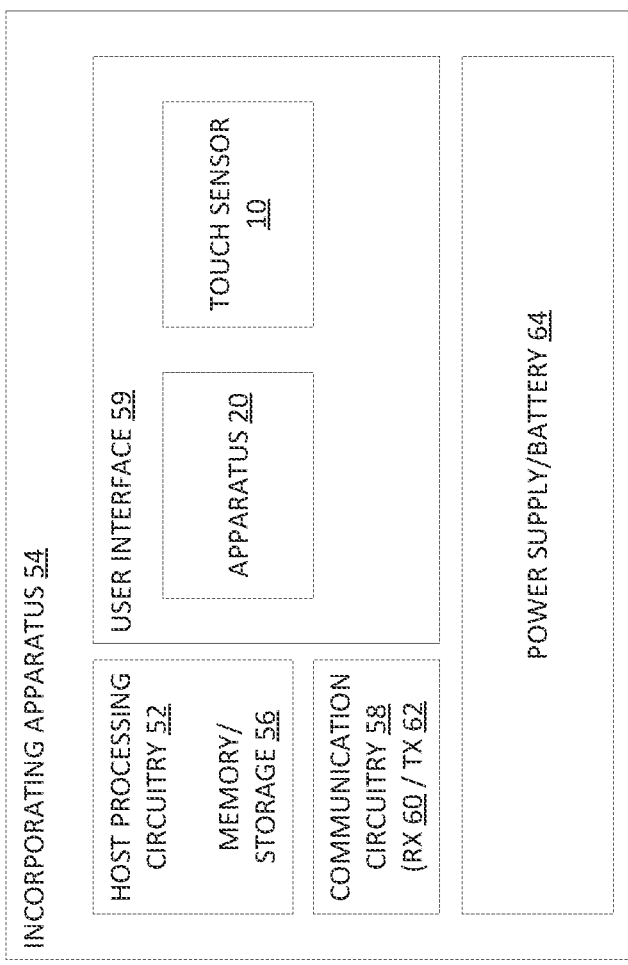
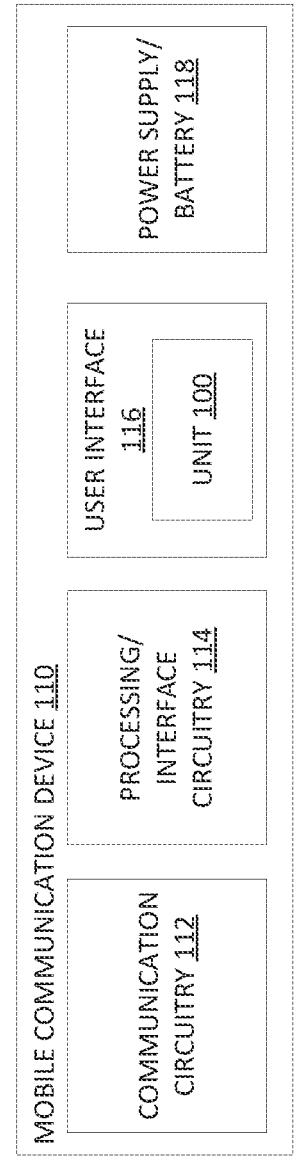

METHOD AND APPARATUS FOR INTERFACING WITH A TOUCH SENSOR

RELATED APPLICATIONS

This application is a continuation-in-part of U.S. application Ser. No. 18/255,472 filed 1 Jun. 2023, which is a National Phase Application of PCT/EP2020/086794 filed 17 Dec. 2020. The entire contents of each aforementioned application is incorporated herein by reference.

TECHNICAL FIELD

The invention relates to touch sensors and particularly relates to interfacing with touch sensors.

BACKGROUND

Touch sensors find widespread use, in everything from laptops and other personal computing devices, such as smartphones and tablets, to banking terminals, point-of-sale terminals, etc. Interfacing with touch sensors imposes several challenges, such as balancing the amount and complexity of the interface circuitry against performance and cost. Here, "performance" refers to the time required for reading the touch sensor to determine whether or where the touch surface of the touch sensor is being touched.

One approach to simplifying and lowering the cost of the interface circuitry relates to how "reading" is implemented. Consider a typical touch sensor implementation in which the touch sensor comprises or is otherwise embedded in a display screen of an electronic device and is arranged as a set of intersecting columns and rows and where reading the touch sensor requires sensing the individual column and row signals from the touch sensor.

As an example arrangement involving capacitive touch sensor technology, a capacitive touchscreen comprises parallel glass plates with an X-Y grid of capacitors formed therebetween, to form intersecting screen columns and screen rows. A touch input to the top glass plate—the touch surface—alters the capacitance of the underlying or proximate capacitors, which alters the voltage of an excitation signal applied to the affected columns/rows. Reading such a touch sensor may be accomplished by digitizing the voltage of the excitation signal as taken from each column and each row and evaluating the digitized voltages, where each column and each row comprises a "line" of capacitors in the X-Y grid.

Reading the individual columns and rows one at a time in a "scanning" fashion minimizes and simplifies the interface circuitry, e.g., by allowing the same analog-to-digital converter (ADC) to be used for digitizing the signal from each respective column and row. However, reading columns and rows one at a time results in scan times that increase directly with the number of columns and/or rows comprised in the touch sensor. Consequently, the approach does not scale well for larger screen sizes and higher touch resolutions. Adding additional ADCs, e.g., one per column or row offers obvious reductions in scan times, albeit at much greater cost, increased power consumption, and increased size.

SUMMARY

A technique for reading the columns and rows of a touch sensor provides several advantages, including scalability to touch sensors with high column/row counts. Reading the touch sensor relies on combining the row or column outputs of the touch sensor, during column and/or row excitation of the touch sensor, with the resulting combined signal or signals transformed into the frequency domain and touch detection based on evaluation of the frequency-domain values corresponding to the excitation frequencies.

One embodiment comprises a method of reading a touch sensor having columns and rows forming a row-column grid. The method including applying a set of column input signals simultaneously to respective column inputs of the touch sensor, each column input signal being an analog signal at a respective frequency, and correspondingly combining row output signals taken from row outputs of the touch sensor to form a combined row signal. Each row output signal has an amplitude that depends on whether the touch sensor is being touched in a horizontal screen region corresponding to the respective row of the touch sensor.

The method further includes applying a set of row input signals simultaneously to respective row inputs of the touch sensor, each row input signal being an analog signal at a respective frequency, and correspondingly combining column output signals taken from respective column outputs of the touch sensor to form a combined column signal. Each column output signal has an amplitude that depends on whether the touch sensor is being touched in a vertical screen region corresponding to the respective column of the touch sensor.

Still further, the method includes performing a frequency-domain transform on digitized samples of the combined row signal and on digitized samples of the combined column signal, to obtain, respectively, a set of column values that depend on the amplitudes of the respective frequency signals in the combined row signal, and a set of row values that depend on the amplitudes of the respective frequency signals in the combined column signal. Correspondingly, the method includes detecting a touch input to the touch sensor by evaluating the column values and the row values.

A related embodiment comprises an apparatus configured for reading a touch sensor as described in the method immediately above. The apparatus comprises first multiplexing circuitry configured to apply the column input signals and the row input signals, and second multiplexing circuitry configured to form the combined row signal and the combined column signal. The apparatus further includes processing circuitry configured to perform touch detection for the touch sensor, based on performing the frequency-domain transformations and evaluation described in the immediately above method.

Another embodiment comprises a second method of reading a touch sensor having columns and rows forming a row-column grid. This second method includes applying a set of first column input signals simultaneously to respective first column inputs of the touch sensor, each first column input signal being an analog signal at a respective frequency, and correspondingly combining first column output signals taken from respective first column outputs of the touch sensor to form a first combined column signal. Each first column output signal corresponds to a respective one of the first column input signals but is altered in amplitude in dependence on whether the touch sensor is being touched in a vertical screen region corresponding to a respective first column of the touch sensor.

The second method further includes applying a set of row input signals simultaneously to respective row inputs of the touch sensor, each row input signal being an analog signal at a respective frequency, and correspondingly combining second column output signals taken from respective second column outputs of the touch sensor to form a second combined column signal. Each second column output signal has an amplitude that depends on whether the touch sensor is being touched in a vertical screen region corresponding to a respective second column of the touch sensor.

Still further, the second method includes performing a frequency-domain transform on digitized samples of the first combined column signal and on digitized samples of the second combined column signal, to obtain, respectively, a set of column values that depend on the amplitudes of the first column output signals in the first combined column signal, and a set of row values that depend on the amplitudes of the respective frequency signals in the second combined column signal. Correspondingly, the second method includes detecting a touch input to the touch sensor by evaluating the column values and the row values. Equivalently, the second method may be performed with treatment of the rows and columns interchanged with respect to that described for the second method.

Another embodiment comprises a third method of reading a touch sensor having columns and rows forming a row-column grid. The third method includes simultaneously applying a set of column input signals to respective column inputs of the touch sensor and a set of row input signals to respective row inputs of the touch sensor. Each column input signal is an analog signal at a respective first frequency, and each row input signal is an analog signal at a respective second frequency different from any of the first frequencies.

The third method further includes combining row output signals taken from respective row outputs of the touch sensor to form a combined row signal. Each row output signal is altered in amplitude in dependence on whether the touch sensor is being touched in a horizontal screen region corresponding to the respective row of the touch sensor and the third method further includes performing a frequency-domain transform on digitized samples of the combined row signal to obtain a set of column values and a set of row values. The column values depend on the amplitudes of the respective first frequency signals in the combined row signal, and the row values depend on the amplitudes of the respective second frequency signals in the combined row signal. Correspondingly, the third method includes detecting a touch input to the touch sensor by evaluating the column values and the row values. Equivalently, the third method may be performed with treatment of the rows and columns interchanged with respect to that described for the second method.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIGS. 3A and 3B are plots of example frequency domain row or column values to be evaluated for touch detection.

FIG. 4 is a logic flow diagram of a first method of reading a touch sensor, according to one embodiment.

FIG. 5 is a logic flow diagram of a second method of reading a touch sensor, according to one embodiment.

FIG. 7 is a block diagram of an incorporating apparatus that incorporates, for example, the apparatus of FIG. 2.

FIG. 8 is a block diagram of a unit according to one embodiment, where the unit includes a touch sensor and an apparatus for reading the touch sensor.

FIG. 9 is a block diagram of a mobile communication device according to one embodiment, where the mobile communication device includes a unit that includes a touch sensor and an apparatus for reading the touch sensor.

DETAILED DESCRIPTION

Figure 1:
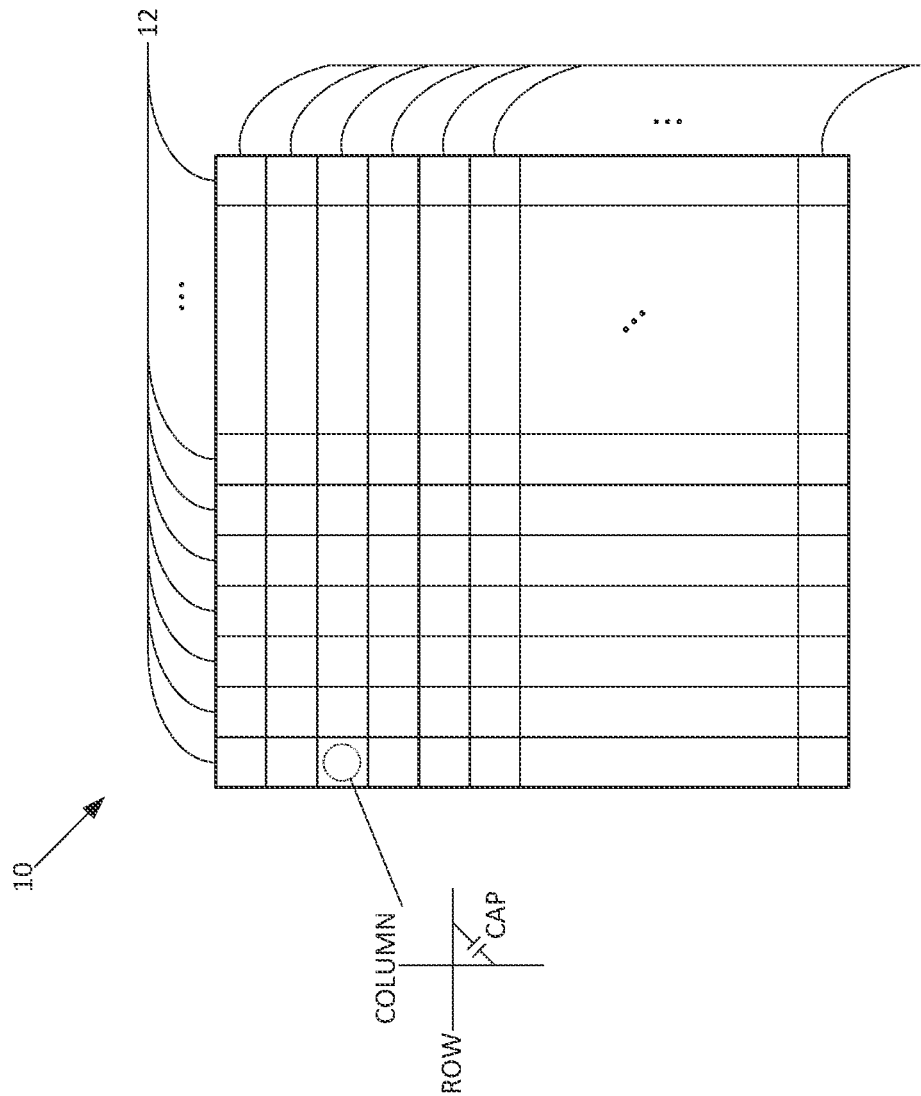
FIG. 1 is a block diagram of an example touch sensor.

FIG. 1 illustrates an example touch sensor 10, shown by way of example with capacitive touch sensing. However, one or more embodiments of an interface apparatus and a reading method as disclosed herein have applicability to any touch sensor outputs analog output signals for detecting touch inputs with respect to a row/column grid of the touch sensor.

A number of columns 12 and a number of rows 14 "divide" the touch surface of the touch sensor 10 into a grid and provide a basis for detecting the X-Y location of touch inputs on the touch surface, in dependence on applying excitation signals to the touch sensor 10 and evaluating the corresponding output signals from the touch sensor 10.

For example, in a given capacitive-sensing embodiment of the touch sensor 10, the touch sensor 10 is a capacitive touchscreen having a touch surface overlaying a capacitive sensing grid formed by columns 12 and rows 14. Each column 12 and row 14 may be a capacitor line with the excitation signal applied to one end of the line and the output signal taken from the other end of the line. For any given column 12 or row 14, the amplitude of output signal is altered relative to the amplitude of the excitation signal in dependence on whether a finger or other conductive item is touching the touch sensor 10 anywhere within the region associated with the column 12 or row 14. Similarly, touch-based changes in resistance also produce amplitude/voltage changes, in resistive-based touch sensors.

Figure 2:
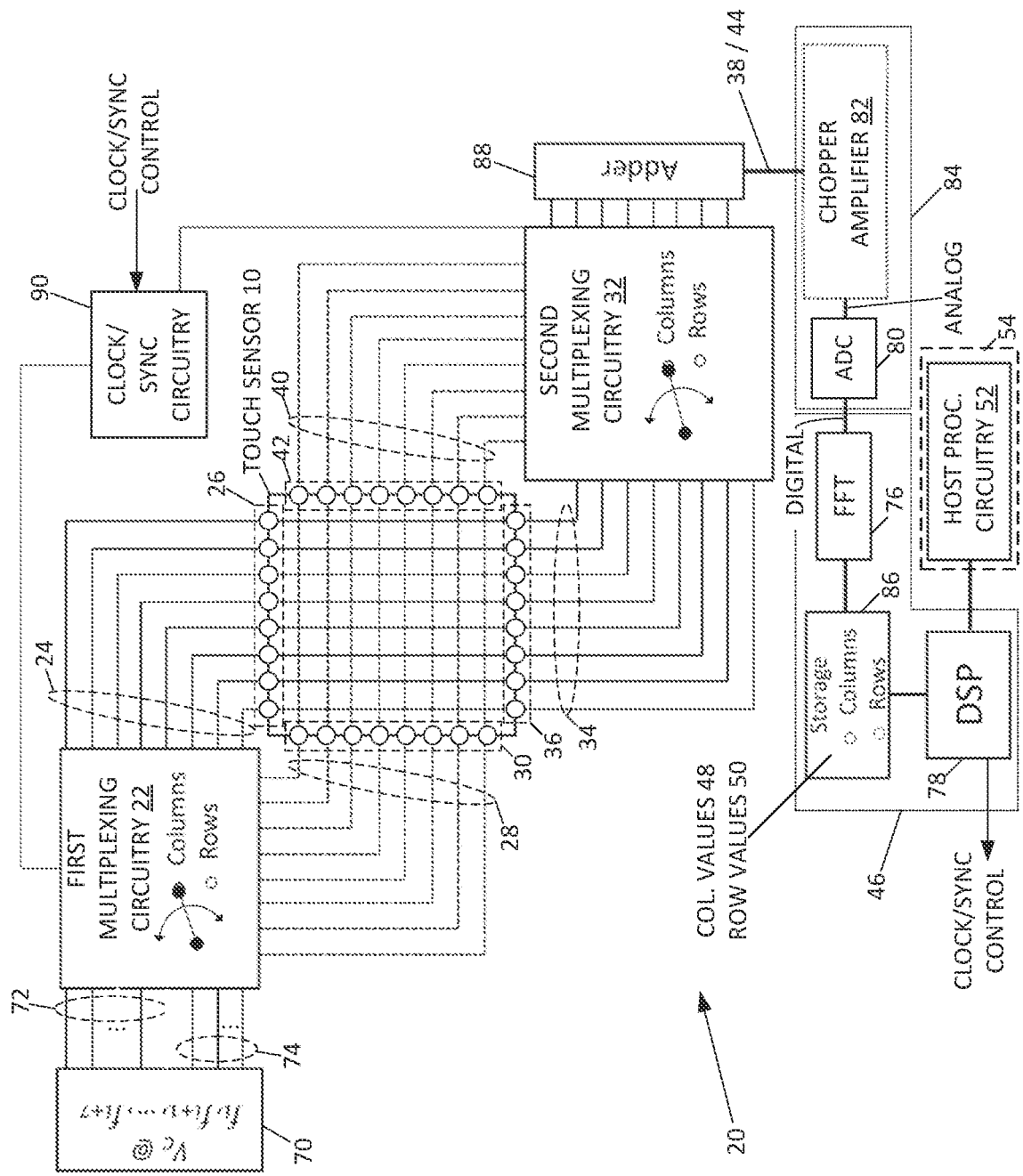
FIG. 2 is a block diagram of an apparatus for reading a touch sensor, according to one embodiment.

FIG. 2 depicts one embodiment of an apparatus 20 for reading a touch sensor 10, where the apparatus 20 offers a number of advantages, such as minimizing component count. As such, the depicted arrangement and involved techniques offer significant advantages in cases where the touch sensor 10 has high column/row counts. The illustrated row/column counts are merely examples and are not limiting. A greater or lesser number of rows and/or columns may be present.

The apparatus 20 is configured for reading a touch sensor 10 having columns 12 and rows 14 forming a row-column grid, with the apparatus 20 including first multiplexing circuitry 22 that is configured to: (a) apply a set of column input signals 24 simultaneously to respective column inputs 26 of the touch sensor 10, each column input signal 24 being an analog signal at a respective frequency; and (b) apply a set of row input signals 28 simultaneously to respective row inputs 30 of the touch sensor 10, each row input signal 28 being an analog signal at a respective frequency. Equivalently, the apparatus 20 is configured to apply the row input signals 28 and then apply the column input signals 24—i.e., the apparatus 20 may be configured to read the columns 12 and then the rows 14 or vice versa.

The apparatus 20 further includes second multiplexing circuitry 32 that is configured to: (a) combine column output signals 34 taken from respective column outputs 36 of the touch sensor 10 to form a combined column signal 38; and (b) combine row output signals 40 taken from respective row outputs 42 of the touch sensor 10 to form a combined row signal 44. In one or more example embodiments, reading is based on "induced" amplitudes. In one example or step, the apparatus 20 applies the row input signals 28 with no excitation applied to the column inputs 26 of the touch sensor 10. With the row input signals 28 applied, the apparatus 20 forms the combined column signal 38. Because of row/column coupling, the combined column signal 38 will contain non-zero signal components at frequencies corresponding to the row(s) involved in touch events. Here, non-zero means above some defined noise floor, and the row(s) involved in the touch event(s) will be known from the frequencies at which non-zero amplitudes are observed in the combined column signal 38.

The same approach may be used with respect to detecting columns that are involved in touch events. Namely, the apparatus 20 applies the column input signals 24 without exciting the rows. The row output signals 40 are combined to form a combined row signal 44, which will have non-zero amplitudes at the frequency or frequencies corresponding to the column(s) that are involved in touch events.

In one example, each column input 26 is one end of a conductive line that runs in a columnar orientation through the touch sensor 10 and each column output 36 is the other end of that same conductive line. Similarly, each row input 30 is one end of a conductive line that runs in a row orientation through the touch sensor 10 and each row output 42 is the other end of that same conductive line. Capacitive coupling between these row/column conductive lines results in the induced amplitudes described above.

Turning to further example details in FIG. 2, the apparatus 20 includes processing circuitry 46 that is configured to: (a) perform a frequency-domain transform on digitized samples of the combined column signal 38 and on digitized samples of the combined row signal 44, to obtain, respectively, a set of column values 48 that depend on the amplitudes of the corresponding column output signals 34 in the combined column signal 38, and a set of row values 50 that depend on the amplitude of the corresponding row output signals 40 in the combined row signal 44; and (b) detect a touch input to the touch sensor 10 by evaluating the column values 48 and the row values 50.

According to various embodiments described herein, the column values 48 may be obtained by applying excitation signals to the column inputs 26, in which case the amplitudes represented by the column values 48 may be considered to be direct. Alternatively, the column values may be obtained by applying excitation signals to the row inputs 30, in which case the amplitudes represented by the column values 48 may be considered to be induced. Reading of the touch sensor 10 may be based on induced amplitudes, or direct amplitudes, or a mix of both. The same logic holds with respect to the row values 50.

The processing circuitry 46 in one or more embodiments is configured to interface with host processing circuitry 52 of an incorporating apparatus 54 that incorporates the touch sensor 10 and the apparatus 20. As a non-limiting example, the incorporating apparatus 54 is a computing device, such as a laptop, tablet, or smartphone.

The processing circuitry 46 includes, for example, a Fast Fourier Transform (FFT) circuit 76 that is configured to perform the frequency-domain transform on the digitized samples of the combined column signal 38 and the digitized samples of the combined row signal 44 as one or more FFTs. The processing circuitry 46 in this example arrangement further includes a digital signal processor (DSP) or other computer processor 78 that integrates or is otherwise operatively coupled to the FFT circuit 76 and is configured to evaluate the column values 48 and the row values 50 generated by the FFT circuit 76.

In at least one embodiment, the first multiplexing circuitry 22 is configured to apply the set of row input signals 28 during a first interval and correspondingly obtain the digitized samples of the combined column signal 38 via an analog-to-digital converter (ADC) 80 of the apparatus 20, and apply the set of column input signals 24 during a second interval that does not overlap with the first interval and correspondingly obtain the digitized samples of the combined row signal 44 via the ADC 80. Of course, "first" and "second" as used here may be understood as labels for differentiating the multiplexed row/column reading of the touch sensor 10 and the read cycle used by the apparatus 20 for each "reading" of the touch sensor 10. Here, a "read cycle" may be understood as the overall collection of operations performed by the apparatus 20 for sensing the state or condition of the respective column output signals 34 and the respective row output signals 34 at a given time, for touch detection.

In at least one embodiment of the apparatus 20, the respective frequencies of the column input signals 24 are distinct from the respective frequencies of the row input signals 28. For example, the first multiplexing circuitry 22 uses a first set of excitation signals 72 as the column input signals 24 and uses a second set of excitation signals 74 as the row input signals 28. With this arrangement, to perform the frequency-domain transform, the processing circuitry 46 is configured to buffer the digitized samples of the combined column signal 38 in a buffer 86 together with the digitized samples of the combined row signal 44 as an overall set of digitized samples and perform a single Fast Fourier Transform (FFT) on the overall set of digitized samples.

In another embodiment, the respective frequencies of the column input signals 24 are the same as the respective frequencies of the row input signals 28. Correspondingly, to perform the frequency-domain transform, the processing circuitry 46 is configured to perform a first FFT on the digitized samples of the combined column signal 38 and perform a second FFT on the digitized samples of the combined row signal 44. For example, there may be one set of excitation signals 72, with the first multiplexing circuitry 22 "reusing" that same set of excitation signals 72 for both the column input signals 24 and the row input signals 28. With this reuse, the individual excitation signal frequencies corresponding to the respective columns 12 are the same as those corresponding to the respective rows 14, hence requiring separate frequency-domain transforms with respect to the digitized samples of the combined column signal 38 and the digitized samples of the combined row signal 44.

With the immediately above details in mind, the first multiplexing circuitry 22 in one or more embodiments is configured to apply the set of column input signals 24 and apply the set of row input signals 28 by multiplexing a common set of excitation signals 72 for application to the respective column inputs 26 during a first interval and application to the respective row inputs 30 during a second interval. Note that clock/sync circuitry 90 may provide clocking/syncing control signals to one or both the first and second multiplexing circuitry 22 and 32. In turn, the processing circuitry 46 may be configured to control the clock/sync circuitry 90.

In further illustrated details, the second multiplexing circuitry 32 includes or is associated with a summing circuit 88 that is configured to form either the combined column signal 38 or the combined row signal 44, based on multiplexing either the column output signals 34 or the row output signals 40 into the summing circuit 88. Further, in one or more embodiments, the apparatus 20 includes a chopper amplifier 82 that is configured or otherwise operative to reduce noise in the combined column signal 38 and in the combined row signal 44, in advance of obtaining the digitized samples of the combined column signal 38 and the digitized samples of the combined row signal 44. In other embodiments, the apparatus 20 omits the chopper amplifier 82.

The chopper amplifier 82 may be advisable in cases where the voltage on the lines is reduced for a low energy consumption because it reduces "flicker noise", which may be dominant with certain semiconductor technologies that provide high sensitivity and low-power operation. For example, if the voltage level is high such that the voltage represented by one Least-Significant-Bit (LSB) is still higher than the noise floor, the chopper amplifier 82 may be omitted without degrading ADC performance.

FIG. 3A illustrates an example touch detection based on induced amplitudes. As noted, "induced amplitude" refers to the evaluation of column output signal amplitudes obtained while row excitation is active or, equivalently, the evaluation of row output signal amplitudes obtained while column excitation is active.

With respect to induced column signals, the apparatus 20 applies the row input signals 28 with no column excitation, and in conjunction forms the combined column signal 38, which is digitized and transformed into the frequency domain. The column values 48 in such an example thus correspond to the frequencies of the row input signals 28 and the column values 48 will exhibit non-zero amplitudes—e.g., amplitudes greater than a defined noise threshold—in dependence on whether or where there is touch input to the touch sensor 10. See the value at $f_{i+3}$ in the figure, for an example induced amplitude indicative of touch, where $f_i$, $f_{i+1}$, and so on correspond to excitation signal frequencies. The same logic holds for obtaining row values 50 based on column excitation.

FIG. 3B illustrates direct excitation, meaning column sensing based on column excitation, or row sensing based on row excitation. For example, with row excitation, the row output signals 40 are expected to be at a nominal amplitude unless there is a touch. If there is a touch, the row output signal(s) 40 corresponding to the row(s) involved in the touch will have a characteristically lower amplitude. See the value at $f_{i+1}$ for an example of a reduced amplitude that is characteristic of touch.

In an example capacitive-sensing implementation of the touch sensor 10, the capacitors used for sensing touch charge and discharge using an alternating voltage cycle. The frequency of charge and discharge is controlled via the supplied voltage—i.e., via the excitation signals applied as column input signals 24 on the column inputs 26 and the excitation signals applied as the row input signals 28 on the row inputs 30. Consider an example excitation-signal frequency of 40 KHz, resulting in the involved capacitors charging and discharging 40,000 times within one second or 4000 times within 0.1 second. A normal touch by a human takes between 0.2 and 0.3 seconds. Hence, there will be 8000-12,000 cycles with an induced amplitude higher than the no-touch case or with a direct amplitude lower than the no-touch case. Such amplitude alterations will be reflected in the frequency component representing the involved capacitor line after taking the FFT and are thus reflected in the column values 48 or row values 50.

FIG. 4 illustrates one embodiment of a method 400 of reading a touch sensor, such as the touch sensor 10 shown in either FIG. 1 or FIG. 2. While the apparatus 20 of FIG. 2 may be configured to perform the method 400, the method 400 may be implemented by any circuitry arrangement that provides for reading the columns 12/rows 14 of the involved touch sensor 10, summing and digitizing the corresponding touch-sensor output signals, and performing the involved frequency-domain transforms and processing. Moreover, one or more "steps" or operations of the illustrated method 400 may be performed in an order other than that suggested by the illustration and/or may be performed in parallel or as part of a larger set of processing operations. Further, the method 400 may be performed equivalently with interchanged treatment of the rows 14 and columns 12.

The method 400 includes applying (402) a set of column input signals simultaneously to respective column inputs of the touch sensor. Each column input signal being an analog signal at a respective frequency, and correspondingly combining row output signals taken from row outputs of the touch sensor to form a combined row signal. Each row output signal has an amplitude that depends on whether the touch sensor is being touched in a horizontal screen region corresponding to the respective row of the touch sensor.

Further, the method 400 includes applying (404) a set of row input signals simultaneously to respective row inputs of the touch sensor, each row input signal being an analog signal at a respective frequency, and correspondingly combining column output signals taken from respective column outputs of the touch sensor to form a combined column signal. Each column output signal has an amplitude that depends on whether the touch sensor is being touched in a vertical screen region corresponding to the respective column of the touch sensor.

Still further, the method 400 includes performing (406) a frequency-domain transform on digitized samples of the combined row signal and on digitized samples of the combined column signal, to obtain, respectively, a set of column values that depend on the amplitudes of the respective frequency signals in the combined row signal, and a set of row values that depend on the amplitudes of the respective frequency signals in the combined column signal. Correspondingly, the method 400 includes detecting (408) a touch input to the touch sensor by evaluating the column values and the row values.

FIG. 5 illustrates a second example method 500 of reading a touch sensor having columns and rows forming a row-column grid. The apparatus of FIG. 2 or another apparatus may be configured to carry out the method 500, e.g., by programming.

The method 500 includes applying (502) a set of first column input signals simultaneously to respective first column inputs of the touch sensor, each first column input signal being an analog signal at a respective frequency, and correspondingly combining first column output signals taken from respective first column outputs of the touch sensor to form a first combined column signal, each first column output signal corresponding to a respective one of the first column input signals but altered in amplitude in dependence on whether the touch sensor is being touched in a vertical screen region corresponding to a respective first column of the touch sensor.

Further, the method 500 includes applying (504) a set of row input signals simultaneously to respective row inputs of the touch sensor, each row input signal being an analog signal at a respective frequency, and correspondingly combining second column output signals taken from respective second column outputs of the touch sensor to form a second combined column signal. Each second column output signal has an amplitude that depends on whether the touch sensor is being touched in a vertical screen region corresponding to a respective second column of the touch sensor.

The method 500 further includes performing (506) a frequency-domain transform on digitized samples of the first combined column signal and on digitized samples of the second combined column signal, to obtain, respectively, a set of column values that depend on the amplitudes of the first column output signals in the first combined column signal, and a set of row values that depend on the amplitudes of the respective frequency signals in the second combined column signal. The method 500 further includes detecting (508) a touch input to the touch sensor by evaluating the column values and the row values.

Figure 6:
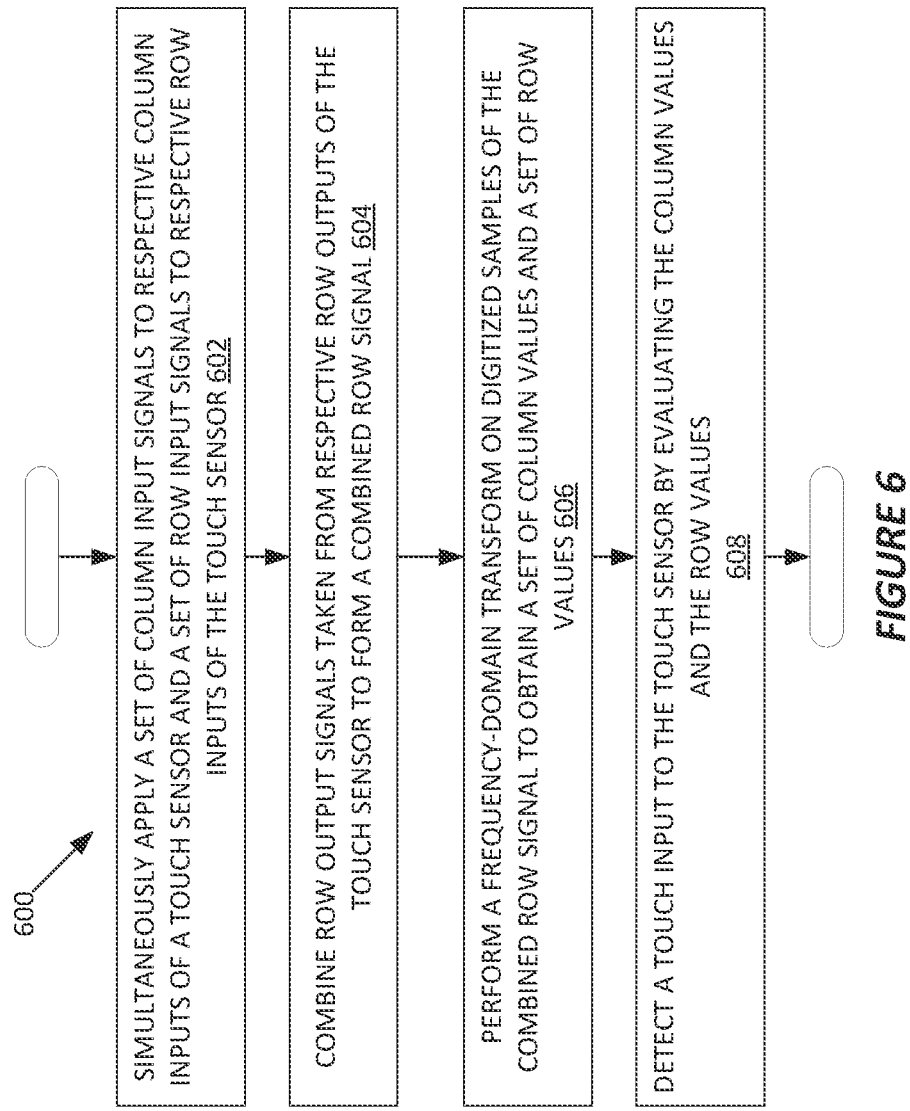
FIG. 6 is a logic flow diagram of a third method of reading a touch sensor, according to one embodiment.

FIG. 6 illustrates a third example method 600 of reading a touch sensor, such as may be performed by the apparatus of FIG. 2 or another apparatus. The method 600 includes simultaneously applying (602) a set of column input signals to respective column inputs of the touch sensor and a set of row input signals to respective row inputs of the touch sensor, each column input signal being an analog signal at a respective first frequency, and each row input signal being an analog signal at a respective second frequency different from any of the first frequencies.

Further, the method 600 includes, with the respect to the column and row input signals being applied, combining (604) row output signals taken from respective row outputs of the touch sensor to form a combined row signal. Here, each row output signal is altered in amplitude in dependence on whether the touch sensor is being touched in a horizontal screen region corresponding to the respective row of the touch sensor. Note that with simultaneous application of column and row input signals, with all signals at different frequencies, this combined row signal includes frequency components corresponding to the respective columns and signal components corresponding to the respective rows.

Thus, the method 600 further includes performing (606) a frequency-domain transform on digitized samples of the combined row signal to obtain a set of column values and a set of row values. The column values depend on the amplitudes of the respective first frequency signals in the combined row signal, and the row values depend on the amplitudes of the respective second frequency signals in the combined row signal. Correspondingly, the method 600 includes detecting (608) a touch input to the touch sensor by evaluating the column values and the row values.

Any of the example methods 400, 500, or 600 may be performed on a repeating basis, e.g., with each performance of the corresponding method being part of one read cycle, and with the involved apparatus performing read cycles on an ongoing basis. Further, any of the methods 400, 500, and 600 may include an "adaptation" phase in which the apparatus 20 determines the frequencies to use for row and/or column excitation. "Determining" may be determining which frequencies to generate or choosing from among a larger set of predefined frequencies available from the signal generator 70. In either case, during the adaptation phase, the apparatus 20 performs FFT processing on digital samples of the combined column signal 38 and/or the combined row signal 44 without applying excitation signals to the touch sensor 10.

Such processing allows the apparatus 20 to detect frequency-specific "interference" in the output column signals 34 and/or the output row signals 40 and thereby adapt (choose) the excitation frequencies used for reading the touch sensor 10, to avoid using excitation frequencies that are in or near the frequencies or frequency ranges of the interference. Additionally or alternatively, the adaptation phase processing provides a basis for the apparatus 20 to determine the noise threshold(s) that are used to detect non-zero induced amplitudes, such as shown in FIG. 3A.

FIG. 7 illustrates an example arrangement of an incorporating apparatus 54 that incorporates an apparatus 20 for reading a touch sensor 10 included in the incorporating apparatus 54. In addition to the incorporating apparatus 54 including host processing circuitry 52 such as shown in FIG. 2, the incorporating apparatus 54 includes memory/storage 56, which comprises one or more types of computer-readable media for short and/or long-term storage, e.g., of computer programs, operating data, etc. The incorporating apparatus 54 further includes communication circuitry 58 comprising one or more receiver circuits 60 and one or more transmitter circuits 62, for supporting one or more transceiver operations. A user interface 59 of the incorporating apparatus 54 includes the touch sensor 10 and the interfacing apparatus 20, for example. Further, the incorporating apparatus 54 includes a power supply and/or battery 64.

In one example, the incorporating apparatus 54 comprises a computing device, such as a laptop, tablet, or smartphone. In a particular example, the incorporating apparatus comprises a communication device that is configured for accessing a wireless communication network, e.g., a cellular network operating according to Third Generation Partnership Project (3GPP) specifications. As such, the communication circuitry 58 includes, for example, one or more radiofrequency transceivers.

Among the various advantages offered by the apparatus 20 shown and described herein by way of example is the reduction in the number of ADCs needed to read the involved touch sensor. Rather than having an ADC for every column/row line, the apparatus 20 may be configured with a single ADC 80 for digitizing the combined column signal 38 for reading the rows 14 of a touch sensor 10 via detection of induced or direct amplitudes, with the same ADC 80 providing digitization of the combined row signal 44 for reading the columns 12 of the touch sensor 10 via detection of induced or direct amplitudes. As noted, FIG. 3A is an example of induced amplitudes, where rows (or columns) are sensed based on column (or row) excitation. FIG. 3B is an example of direct amplitudes, where rows (or columns) are sensed based on row (or column) excitation. Note, too, that the amplitudes may be proportional to touch force or pressure.

The apparatus 20 can identify where a touch happened and for how long, based on evaluating the column values 48 and the row values 50 over one or more read cycles of the touch sensor 10. In this regard, the column values 48 can be understood as numeric values indicating the amplitudes of the respective column output signals 34 captured in the digitized samples of the combined column signal 38. Likewise, the row values 50 can be understood as numeric values indicating the amplitudes of the respective row output signals 40 captured in the digitized samples of the combined row signal 44. The respective excitation frequencies may be spaced apart by an amount to provide adequate "frequency guard bands"—i.e., to ensure clear separability in the frequency domain as between the individual column values 48 and between the individual row values 50.

The apparatus 20 also offers significant cost advantages for increasing column/row counts because the larger column/row counts can be accommodated in the digital domain using a larger number of points in the FFT(s) used for the frequency-domain transforms. Of course, the first and second multiplexing circuitry 22 and 32 must be able to accommodate the involved numbers of columns 12 and rows 14, but such changes have minimal impact on the underlying design which scales up or down nicely, for different column/row counts.

Further, the touch-sensor interfacing/reading technique embodied in any of the methods 400, 500, and 600 provides potentially higher sensitivity as compared to conventional arrangements that use per-row and per-column scanning, because the touch "strength" or pressure can be accurately detected. Still further, the technique easily accommodates an increase of the framerate—the read-cycle periodicity of the touch sensor 10—and that provides more frequent touch readings to the host processing circuitry 52 and, correspondingly, more fluid touch responsiveness.

FIG. 8 depicts a "unit" or assembly 100 that includes a touch sensor 10 and an apparatus 20 configured for reading the touch sensor 10. For example, the unit 10 comprises a capacitive touch screen as the touch sensor 10 and includes an apparatus 20 like the one introduced in FIG. 2, for reading the capacitive touch screen. Of course, other types or variations of touch sensor may be included in the unit 100, which may be provided for incorporation into various types of electronic systems or devices.

FIG. 9 illustrates one example of incorporation, where the unit 100 forms a part of a mobile communication device 110. As an example, the mobile communication device 110 may be understood as another example or variation of the incorporating apparatus 54 introduced in FIG. 7. In the illustrated embodiment, the mobile communication device 110 includes communication circuitry 112, processing and interface circuitry 114, a user interface 116 that includes the unit 100, and a power supply and/or battery 118.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of reading a touch sensor having columns and rows forming a row-column grid, the method comprising:
applying a set of column input signals simultaneously to respective column inputs of the touch sensor, each column input signal being an analog signal at a respective frequency, and correspondingly combining row output signals taken from row outputs of the touch sensor to form a combined row signal, each row output signal having an amplitude in dependence on whether the touch sensor is being touched in a horizontal screen region corresponding to the respective row of the touch sensor;
applying a set of row input signals simultaneously to respective row inputs of the touch sensor, each row input signal being an analog signal at a respective frequency, and correspondingly combining column output signals taken from respective column outputs of the touch sensor to form a combined column signal, each column output signal having an amplitude in dependence on whether the touch sensor is being touched in a vertical screen region corresponding to the respective column of the touch sensor;
performing a frequency-domain transform on digitized samples of the combined row signal and on digitized samples of the combined column signal, to obtain, respectively, a set of column values that depend on the amplitudes of the respective frequency signals in the combined row signal, and a set of row values that depend on the amplitudes of the respective frequency signals in the combined column signal; and
detecting a touch input to the touch sensor by evaluating the column values and the row values.

2. The method according to claim 1, wherein evaluating the column values and the row values comprises, for the row values, identifying any row values having a magnitude that is indicative of a touch, and, for the column values, identifying any column values having a magnitude indicative of a touch.

3. The method according to claim 2, wherein any row value or column value that is above a defined magnitude threshold is indicative of a touch.

4. An apparatus configured for reading a touch sensor having columns and rows forming a row-column grid, the apparatus comprising:
first multiplexing circuitry configured to:
apply, as column excitation, a set of column input signals simultaneously to respective column inputs of the touch sensor, each column input signal being an analog signal at a respective frequency; and
apply, as row excitation, a set of row input signals simultaneously to respective row inputs of the touch sensor, each row input signal being an analog signal at a respective frequency;
second multiplexing circuitry configured to:
combine column output signals taken from respective column outputs of the touch sensor to form a combined column signal, each column output signal corresponding to a respective one of the column input signals; and
combine row output signals taken from respective row outputs of the touch sensor to form a combined row signal, each row output signal corresponding to a respective one of the row input signals; and
processing circuitry configured to:
control the first and second multiplexing circuitry to obtain a set of column values and a set of row values, wherein the column values are obtained by performing a frequency-domain transform on digitized samples of the combined column signal during row excitation, such that the column values depend on the amplitudes of the corresponding column output signals, and wherein the row values are obtained by performing a frequency-domain transform on digitized samples of the combined row signal during column excitation, such that the row values depend on the amplitudes of the corresponding row output signals;
detect a touch input to the touch sensor by evaluating the column values and the row values.

5. The apparatus according to claim 4, wherein, for evaluating the column values and the row values, the processing circuitry is configured to identify any row values having a magnitude that is indicative of a touch and identify any column values having a magnitude indicative of a touch.

6. The apparatus according to claim 5, wherein any row or column value that is above a defined magnitude threshold is indicative of a touch.

7. A unit comprising the apparatus of claim 4, integrated with the touch sensor.

8. A mobile communication device comprising the unit of claim 7.

9. A method of reading a touch sensor having columns and rows forming a row-column grid, the method comprising:

applying a set of first column input signals simultaneously to respective first column inputs of the touch sensor, each first column input signal being an analog signal at a respective frequency, and correspondingly combining first column output signals taken from respective first column outputs of the touch sensor to form a first combined column signal, each first column output signal corresponding to a respective one of the first column input signals but altered in amplitude in dependence on whether the touch sensor is being touched in a vertical screen region corresponding to a respective first column of the touch sensor;

applying a set of row input signals simultaneously to respective row inputs of the touch sensor, each row input signal being an analog signal at a respective frequency, and correspondingly combining second column output signals taken from respective second column outputs of the touch sensor to form a second combined column signal, each second column output signal having an amplitude in dependence on whether the touch sensor is being touched in a vertical screen region corresponding to a respective second column of the touch sensor;

performing a frequency-domain transform on digitized samples of the first combined column signal and on digitized samples of the second combined column signal, to obtain, respectively, a set of column values that depend on the amplitudes of the first column output signals in the first combined column signal, and a set of row values that depend on the amplitudes of the respective frequency signals in the second combined column signal; and detecting a touch input to the touch sensor by evaluating the column values and the row values.

10. A method of reading a touch sensor having columns and rows forming a row-column grid, the method comprising:

simultaneously applying a set of column input signals to respective column inputs of the touch sensor and a set of row input signals to respective row inputs of the touch sensor, each column input signal being an analog signal at a respective first frequency, and each row input signal being an analog signal at a respective second frequency different from any of the first frequencies;

combining row output signals taken from respective row outputs of the touch sensor to form a combined row signal, each row output signal altered in amplitude in dependence on whether the touch sensor is being touched in a horizontal screen region corresponding to the respective row of the touch sensor;

performing a frequency-domain transform on digitized samples of the combined row signal to obtain a set of column values and a set of row values, wherein the column values depend on the amplitudes of the respective first frequency signals in the combined row signal, and the row values depend on the amplitudes of the respective second frequency signals in the combined row signal; and detecting a touch input to the touch sensor by evaluating the column values and the row values.

* * * * *